(12) United States Patent
Raffaldt

(10) Patent No.: US 9,127,443 B1
(45) Date of Patent: Sep. 8, 2015

(54) REMOTE WATER SHUT-OFF VALVE SYSTEM

(71) Applicant: Floyd L. Raffaldt, Blackstock, SC (US)

(72) Inventor: Floyd L. Raffaldt, Blackstock, SC (US)

( * ) Notice: Subject to any disclaimer, the term of this patent is extended or adjusted under 35 U.S.C. 154(b) by 451 days.

(21) Appl. No.: 13/627,131

(22) Filed: Sep. 26, 2012

(51) Int. Cl.
*E03B 7/07* (2006.01)
*F16K 31/05* (2006.01)
*F16K 31/02* (2006.01)

(52) U.S. Cl.
CPC ............... *E03B 7/071* (2013.01); *F16K 31/02* (2013.01); *F16K 31/05* (2013.01); *Y10T 137/86397* (2015.04)

(58) Field of Classification Search
CPC ......... E03B 7/071; F16K 31/02; F16K 31/05; Y10T 137/86397
USPC ............... 137/624.12; 251/129.03, 129.04
See application file for complete search history.

(56) References Cited

U.S. PATENT DOCUMENTS

| | | | |
|---|---|---|---|
| 5,076,321 A | 12/1991 | Terry | |
| 6,556,142 B2 * | 4/2003 | Dunstan | 340/606 |
| 6,661,350 B1 * | 12/2003 | Rohrberg et al. | 340/12.28 |
| D511,703 S | 11/2005 | Moyer | |
| 7,147,204 B2 | 12/2006 | Hollingsworth et al. | |
| 7,559,529 B2 * | 7/2009 | Affaticati et al. | 251/129.04 |
| 7,900,650 B1 * | 3/2011 | Wilson | 137/601.14 |
| 8,028,355 B2 * | 10/2011 | Reeder et al. | 4/623 |
| 8,857,466 B1 * | 10/2014 | Wilson | 137/599.11 |
| 2005/0235306 A1 * | 10/2005 | Fima | 725/10 |
| 2005/0236594 A1 | 10/2005 | Lilly et al. | |
| 2006/0191324 A1 | 8/2006 | Garabedian et al. | |
| 2008/0295895 A1 | 12/2008 | Vincent et al. | |
| 2010/0307600 A1 * | 12/2010 | Crucs | 137/2 |
| 2011/0114202 A1 * | 5/2011 | Goseco | 137/487.5 |
| 2013/0248023 A1 * | 9/2013 | Estrada, Jr. | 137/551 |
| 2015/0013772 A1 * | 1/2015 | Patel et al. | 137/1 |

* cited by examiner

*Primary Examiner* — Matthew W Jellett

(57) ABSTRACT

A remote water shut-off valve system for isolating a water supply line to a structure includes the structure having a vertical wall with a shut-off valve fluidly located in a water supply line for sealing an upstream side of the water supply line from a downstream side to isolate water flow. The system includes a microprocessor, a valve receiver, a valve actuator, an activation switch, and a remote transmitter. For operation, an activation signal is sent to the microprocessor via the remote transmitter or the activation switch. The activation signal is sent to the actuator from the microprocessor. The actuator moves the shut-off valve into either an open or a closed position. The shut-off valve divides an upstream side of the water supply line from a downstream side of the water supply line to isolate water flow.

1 Claim, 2 Drawing Sheets

REMOTE WATER SHUT-OFF VALVE SYSTEM

BACKGROUND OF THE INVENTION

In municipalities, pressurized water is supplied to residences and businesses for use by the occupants. This modern convenience began to become available in urban areas of the developed world during the last quarter of the 19th century, end became more common during the 20th century. A significant hazard of pressurized water, however, is the possibility of pipe or valve failure, which allows pressurized water to flow freely in the residence or building causing great property damage. The present invention features a remote water shut-off valve system for isolating a water supply line to a structure.

SUMMARY

The present invention features a remote water shut-off valve system for isolating a water supply line to a structure. In some embodiments, the system comprises a structure having a vertical wall. In some embodiments, the system comprises a water supply line to the structure.

In some embodiments the system comprises a shut-off valve fluidly located in the water supply line. In some embodiments, the shut-off valve is for sealing an upstream side of the water supply line from a downstream side of the water supply line to isolate water flow. In some embodiments the system comprises a microprocessor operatively connected to a power source. In some embodiments, the system comprises a valve receiver operatively connected to the microprocessor. In some embodiments, the system comprises a valve actuator operatively connected to the microprocessor. In some embodiments, the valve actuator is located on and coupled to the shut-off valve. In some embodiments, the system comprises an activation switch operatively connected to the microprocessor. In some embodiments the system comprises a remote transmitter.

In some embodiments, for operation, an activation signal is sent to the microprocessor via the remote transmitter or alternately, an activation signal is sent to the microprocessor via the activation switch. In some embodiments, the activation signal is sent to the actuator from the microprocessor. In some embodiments, the actuator moves the shut-off valve in an open position. In some embodiments, the actuator moves the shut-off valve in a closed position. In some embodiments, the shut-off valve seals an upstream side of the water supply line from a downstream side of the water supply to isolate water flow.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
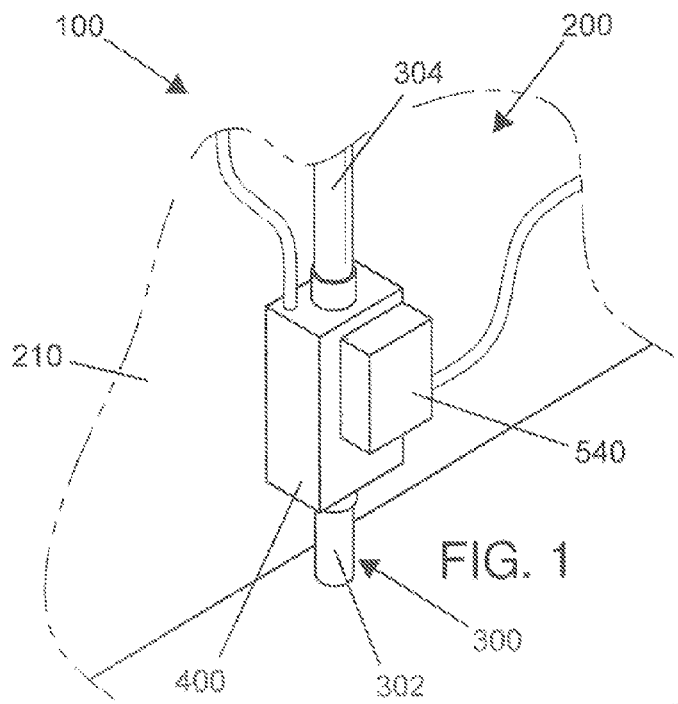
FIG. 1 is a perspective view of the present invention.
Figure 2:
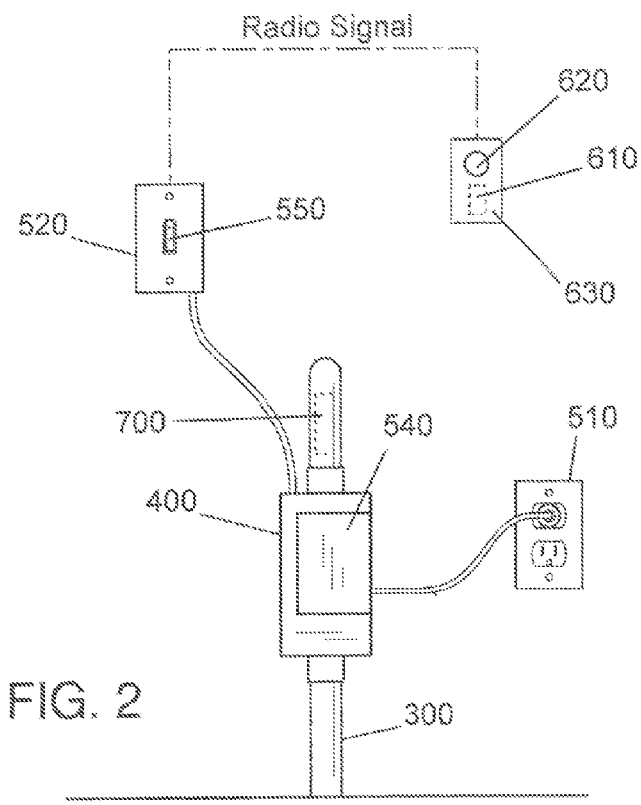
FIG. 2 is a front view of the present invention.
Figure 3:
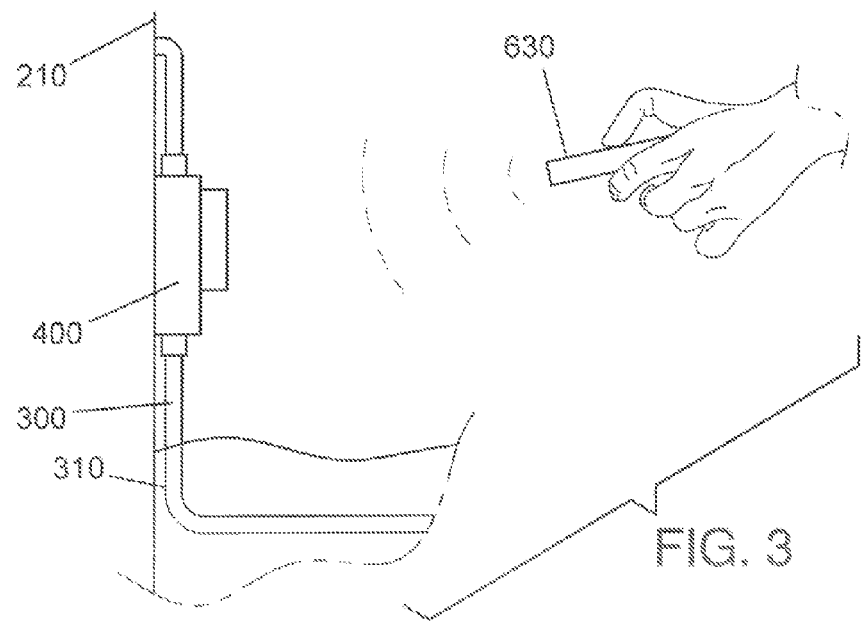
FIG. 3 is a side view of the present invention.
Figure 4:
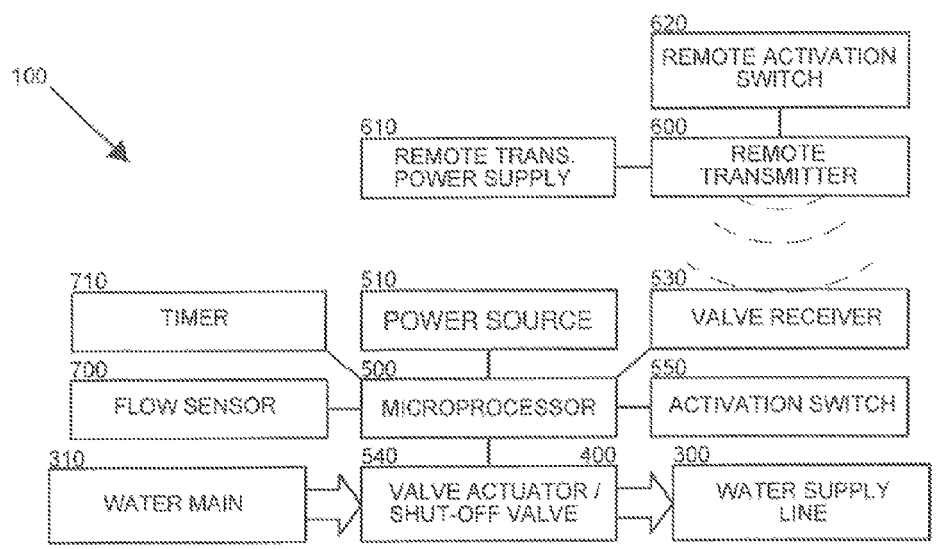
FIG. 4 is a schematic view of the present invention.

Following is a list of elements corresponding to a particular element referred to herein:

100 Remote water shutoff system
200 Structure
210 Vertical wall
300 Water supply line
302 Upstream side
304 Downstream side
310 Water main
400 Shut-off valve
500 Microprocessor
510 Power source
520 Housing
530 Valve receiver
540 Valve actuator
550 Activation switch
600 Remote transmitter
610 Remote transmitter power supply
620 Remote activation switch
630 Transmitter housing
700 Flow sensor
710 Timer Referring now to FIGS. 1-4, the present invention features a remote water shut-off valve system (100) for isolating a water supply line (300) to a structure (200). In some embodiments, the system (100) comprises a structure (200) having a vertical wall (210). In some embodiments, the structure (200) is a building. In some embodiments, the structure (200) is a house. In some embodiments, the structure (200) is a commercial building. In some embodiments, the structure (200) is a recreational vehicle, for example, a camper.

In some embodiments, the system (100) comprises a water supply line (300) to the structure (200). In some embodiments, the water supply line (300) is fluidly connected to a water main (310). In some embodiments, the water supply line (300) transports water to the structure (200) for use. In some embodiments, the water supply in (300) is constructed from polyvinyl chloride. In some embodiments, the water supply line (300) is constructed from copper. In some embodiments, the water supply line (300) is constructed from metal.

In some embodiments, the system (100) comprises a shut-off valve (400) fluidly located in the water supply line (300). In some embodiments, the shut-off valve (400) is for sealing an upstream side (302) of the water supply line (300) from a downstream side (304) of the water supply line (300) to isolate water flow. In some embodiments, the shut-off valve (400) is a ball valve. in some embodiments, the shut-off valve (400) is a gate valve. In some embodiments, the shut-off valve (400) is a globe valve. In some embodiments the shut-off valve (400) is a butterfly valve. In some embodiments, the shut-off valve (400) is a high-pressure rated valve.

In some embodiments, the system (100) comprises a microprocessor (500) operatively connected to a power source (510). In some embodiments, the microprocessor (500) is located in a housing (520). In some embodiments, the system (100) comprises a valve receiver (530) operatively connected to the microprocessor (500). In some embodiments, the valve receiver (530) is located close to the microprocessor (500) in the housing (520). In some embodiments, the system (100) comprises a valve actuator (540) operatively connected to the microprocessor (500). In some embodiments, the valve actuator (540) is located on and coupled to the shut-off valve (400). In some embodiments, the system comprises an activation switch (550) operatively connected to the microprocessor (500). In some embodiment, the activation switch (550) is located on the vertical wall (210). In some embodiments, the activation switch (550) is located on the housing (510). In some embodiments, the housing (510) is located on the shutoff valve (400).

In some embodiments, the system (100) comprises a remote transmitter (600) operatively connected to a remote transmitter power supply (610). In some embodiments, a remote activation switch (620) is operatively connected to the remote transmitter (600). In some embodiments, the remote transmitter (600) and the remote transmitter power supply (610) are located in a transmitter housing (630). In some embodiments, the remote activation switch (620) is located on the transmitter housing (630).

In some embodiments, for operation, an activation signal is sent to the microprocessor (500) (and received by the valve receiver (530)) via the remote transmitter (600). In some embodiments, an activation signal is sent to the microprocessor (500) via the activation switch (550). In some embodiments, the activation signal is sent to the valve actuator (540) from the microprocessor (500). In some embodiments, the valve actuator (540) disposes the shut-off valve (400) in an open position. In some embodiments, the actuator disposes the shut-off valve (400) in a closed position. In some embodiments, the shut-off valve (400) seals an upstream side (302) of the water supply line (300) from a downstream side (304) of the water supply line (300) to isolate water flow.

In some embodiments, the activation switch (550) is remotely located with respect to the shut-off valve (400) and the valve actuator (540). In some embodiments, the housing (520) is remotely located with respect to the shut-off valve (400) and the valve actuator (540).

In some embodiments, the microprocessor (500) comprises a timer (710) located therein. In some embodiments, the microprocessor (500) actuates the shut-off valve (400) via the timer (710). In some embodiments, the microprocessor comprises a program disposed therein for moving the shut-off valve (400) into an open position or a closed position. In some embodiments, the microprocessor comprises a program disposed therein for moving the shut-off valve (400) into an open position or a closed position via the timer (710).

In some embodiments, a flow sensor (700) is operatively connected to the microprocessor (500). In some embodiments, the flow sensor (700) is located in the water supply line (300). In some embodiments, the microprocessor (500) actuates the shut-off valve (400) via a flow signal from the flow sensor (700). In some embodiments, the microprocessor comprises a program disposed therein for moving the shut-off valve (400) into an open position or a closed position via input from the flow sensor (700).

In some embodiments, the system (100) is adapted for use in a recreational vehicle. In some embodiments, the power source (510) is direct current voltage.

As used herein, the term "about" refers to plus or minus 10% of the referenced number. For example, an embodiment wherein the shut-off valve is about 10 inches in length includes a shut-off valve that is between 9 and 11 inches in length.

The disclosures of the following U.S. Patents are incorporated in their entirety by reference herein: U.S. Pat. No. D511,703; U.S. Pat. Pub. No. 2008/0296895; U.S. Pat. Pub. No. 2006/0191324: U.S. Pat. Pub. No. 2005/0236594; U.S. Pat. No. 7,147,204; U.S. Pat. No. 5,076,321.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A remote water shut-off valve system (100) for isolating a water supply line (300) to a structure (200), said system (100) consisting of:
   (a) the structure (200) consisting of a vertical wall (210);
   (b) the water supply line (300) to the structure (200), wherein the water supply line (300) is fluidly connected to a water main (310), wherein the water supply line (300) transports water to the structure (200) for use;
   (c) a shut-off valve (400) fluidly disposed in the water supply line (300), wherein the shut-off valve (400) is for sealably dividing an upstream side (302) of the water supply line (300) from a downstream side (304) of the water supply line (300) to isolate water flow;
   (c) a microprocessor (500) operatively connected to a power source (510), wherein the microprocessor (500) is disposed in a housing (520);
   (d) a valve receiver (530) operatively connected to the microprocessor (500), wherein the valve receiver (530) is disposed proximal to the microprocessor (500), wherein the valve receiver (530) is disposed in the housing (520);
   (e) a valve actuator (540) operatively connected to the microprocessor (500), wherein the valve actuator (540) is disposed on and coupled to the shut-off valve (400);
   (f) an activation switch (550) operatively connected to the microprocessor (500), wherein the activation switch (550) is disposed on the vertical wall (210); and
   (g) a remote transmitter (600) operatively connected to a remote transmitter power supply (610), wherein a remote activation switch (620) is operatively connected to the remote transmitter (600), wherein the remote transmitter (600) and the remote transmitter power supply (610) are disposed in a transmitter housing (630), wherein the remote activation switch (620) is disposed on the transmitter housing (630);
   wherein the activation switch (550) or the remote activation switch (620) triggers an activation signal to be sent to the microprocessor (500) for activating the valve actuator (540) to open or close the shut-off valve (400);
   wherein for operation, the activation signal is sent to the microprocessor (500) via the remote transmitter (600) or alternately, the activation signal is sent to the microprocessor (500) via the activation switch (550), wherein the activation signal is sent to the valve actuator (540) from the microprocessor (500), wherein the valve actuator (540) disposes the shut-off valve (400) into an open position, wherein the actuator disposes the shut-off valve (400) into a closed position, wherein the shut-off valve (400) sealably divides the upstream side (302) of the water supply line (300) from the downstream side (304) of the water supply line (300) to isolate water flow.

* * * * *